(12) United States Patent
Han

(10) Patent No.: US 10,328,789 B2
(45) Date of Patent: Jun. 25, 2019

(54) COOLING SYSTEM OF HYBRID ELECTRIC VEHICLE AND METHOD FOR CONTROLLING THE SAME

(71) Applicant: HYUNDAI MOTOR COMPANY, Seoul (KR)

(72) Inventor: Kyung-Su Han, Hwaseong-si (KR)

(73) Assignee: HYUNDAI MOTOR COMPANY, Seoul (KR)

( * ) Notice: Subject to any disclaimer, the term of this patent is extended or adjusted under 35 U.S.C. 154(b) by 471 days.

(21) Appl. No.: 14/793,597

(22) Filed: Jul. 7, 2015

(65) Prior Publication Data

US 2016/0096413 A1    Apr. 7, 2016

(30) Foreign Application Priority Data

Oct. 7, 2014  (KR) .................. 10-2014-0135105

(51) Int. Cl.
*B60K 11/02*    (2006.01)
*B60K 1/00*    (2006.01)

(52) U.S. Cl.
CPC ........ *B60K 11/02* (2013.01); *B60K 2001/003* (2013.01); *B60K 2001/006* (2013.01)

(58) Field of Classification Search
CPC ... B60K 11/02; B60K 6/20; B60K 6/48; F01P 3/20; F01P 5/14; F01P 7/165; F01P 11/029; F01P 11/16; F01P 11/18; F01P 2025/70; F01P 2031/36; F01P 2050/24
See application file for complete search history.

(56) References Cited

U.S. PATENT DOCUMENTS

| 3,832,982 A * | 9/1974 | Guehr | F01P 5/14 |
| | | | 123/198 D |
| 5,070,832 A * | 12/1991 | Hapka | F01M 1/22 |
| | | | 123/198 D |
| 5,094,192 A * | 3/1992 | Seiffert | F01P 3/22 |
| | | | 123/198 DB |
| 2003/0172882 A1* | 9/2003 | Nakano | F01P 5/14 |
| | | | 123/41.1 |
| 2004/0129067 A1* | 7/2004 | Mauro | F01P 5/14 |
| | | | 73/114.71 |
| 2008/0251303 A1* | 10/2008 | Rouaud | B60K 6/26 |
| | | | 180/65.27 |
| 2011/0098883 A1* | 4/2011 | Eser | F01P 5/14 |
| | | | 701/33.4 |
| 2013/0299256 A1* | 11/2013 | Yamashita | E02F 9/2095 |
| | | | 180/68.1 |

(Continued)

FOREIGN PATENT DOCUMENTS

| KR | 10-2010-0074791 A | 7/2010 |
| KR | 10-2013-0019178 A | 2/2013 |
| KR | 10-2013-0068893 A | 6/2013 |

*Primary Examiner* — Travis C Ruby
(74) *Attorney, Agent, or Firm* — Morgan Lewis & Bockius LLP

(57) ABSTRACT

A cooling system of a hybrid electric vehicle (HEV) includes an engine cooling circuit that cools cooling water using an engine heat exchanger and circulates the cooled cooling water using an engine water pump to cool an engine. An HEV cooling circuit cools cooling water using an HEV heat exchanger and circulates the cooled cooling water using an HEV water pump to cool an inverter and a motor. A connection part connects the engine cooling circuit to the HEV cooling circuit.

4 Claims, 2 Drawing Sheets

(56) References Cited

U.S. PATENT DOCUMENTS

| | | | |
|---|---|---|---|
| 2015/0267708 A1* | 9/2015 | Masuda | B60K 6/485 417/45 |
| 2016/0047374 A1* | 2/2016 | Gonze | F01P 11/14 73/168 |
| 2016/0281586 A1* | 9/2016 | Hosokawa | F01P 11/16 |

* cited by examiner

COOLING SYSTEM OF HYBRID ELECTRIC VEHICLE AND METHOD FOR CONTROLLING THE SAME

CROSS-REFERENCE TO RELATED APPLICATIONS

This application claims the benefit of priority to Korean Patent Application No. 10-2014-0135105, filed on Oct. 7, 2014, which is incorporated herein by reference in its entirety.

TECHNICAL FIELD

The present disclosure relates to a cooling system of a hybrid electric vehicle (HEV) vehicle and a control method thereof, and more particularly, to a cooling system of an HEV and a control method thereof capable of providing cooling water of an engine cooling circuit to an HEV cooling circuit in emergency situations in which an HEV system is overheated.

BACKGROUND

A hybrid electric vehicle (HEV) has been developed to improve environmental protection and performance. The HEV includes two driving sources of an engine and a motor and an inverter which converts a DC current of a secondary battery into an AC current and supplies the AC current to the motor. The HEV requires an apparatus for cooling the motor and the inverter, in addition to the existing engine cooling system. Therefore, the existing HEV is provided with an engine cooling circuit for engine cooling and an HEV cooling circuit for an HEV system, and circulates cooling water to the cooling circuits to cool the engine or the HEV system. However, since a cooling water control temperature (85° C. to 95° C.) of the engine cooling circuit and a cooling water control temperature (35° C. to 50° C.) of the HEV cooling circuit are different, the engine cooling circuit and the HEV cooling circuit are independent from each other.

Therefore, according to the related art, when the HEV system is overheated due to lack of cooling water of the HEV cooling circuit, a failure of a HEV water pump, or the like, driving may be impossible.

SUMMARY

An aspect of the present inventive concept provides an independent operation of an engine cooling circuit and an HEV cooling circuit in normal driving situations and provides cooling water of the engine cooling circuit to the HEV cooling circuit in emergency situations in which an HEV system is overheated.

Other objects and advantages of the present disclosure can be understood by the following description, and become apparent with reference to the embodiments of the present inventive concept. Also, it is obvious to those skilled in the art to which the present disclosure pertains that the objects and advantages of the present disclosure can be realized by the means as claimed and combinations thereof.

In accordance with an embodiment of the present inventive concept, a cooling system of a hybrid electric vehicle (HEV) includes an engine cooling circuit that may cool cooling water using an engine heat exchanger and circulate the cooled cooling water using an engine water pump to cool an engine. An HEV cooling circuit may cool cooling water using an HEV heat exchanger and circulate the cooled cooling water using an HEV water pump to cool an inverter and a motor. A connection part may connect the engine cooling circuit to the HEV cooling circuit.

The connection part may include a check valve that blocks the cooling water from flowing from the HEV cooling circuit to the engine cooling circuit.

The connection part may connect a front end of the engine to a front end of the inverter.

The connection part may include an electrical opening valve that opens and closes the connection part.

The cooling system may further include a hybrid control unit (HCU) configured to receive information on at least any one of a motor temperature, an inverter temperature, an engine cooling water temperature, an HEV cooling water temperature, and an HEV water pump operation to open or close the electrical opening valve.

In accordance with another embodiment of the present inventive concept, a method for controlling a cooling system of a hybrid electric vehicle (HEV) includes determining whether an HEV cooling circuit operates abnormally. If the HEV cooling circuit operates abnormally, whether an engine cooling water temperature is less than a first preset temperature is determined. If the engine cooling water temperature is less than the first preset temperature, an electrical opening valve is open to introduce the engine cooling water into the HEV cooling circuit. Whether the HEV is turned off is determined after the electric opening valve is open. If the HEV is turned off, the electrical opening valve is closed. The step of opening the electric opening valve introduces the engine cooling water only in a direction from an engine cooling circuit toward the HEV cooling circuit.

The step of determining the abnormal operation may include determining whether an HEV water pump does not operate.

The step of determining the abnormal operation may include, if the HEV water pump is not operating, determining whether an HEV cooling water temperature exceeds a second preset temperature.

The method may further include, if the engine cooling water temperature is equal to or more than the first preset temperature, cooling engine cooling water in which an engine output is reduced and an engine exchanger maximally operates if it is determined that the engine cooling water temperature is equal to or more than the first preset temperature.

DETAILED DESCRIPTION

Terms and words used in the present specification and claims are not to be construed as a general or dictionary meaning but are to be construed meaning and concepts meeting the technical ideas of the present disclosure based on a principle that the inventors can appropriately define the concepts of terms in order to describe their own inventions in best mode. Therefore, the configurations described in the exemplary embodiments and drawings of the present inventive concept are merely examples but do not represent all of the technical spirit of the present disclosure. Thus, the present disclosure should be construed as including all the changes, equivalents, and substitutions included in the spirit and scope of the present disclosure at the time of filing this application. In the present specification, an overlapped description and a detailed description for well-known functions and configurations that may obscure the gist of the present disclosure will be omitted. Hereinafter, exemplary embodiments of the present inventive concept will be described in detail with reference to the accompanying drawings.

Figure 1:
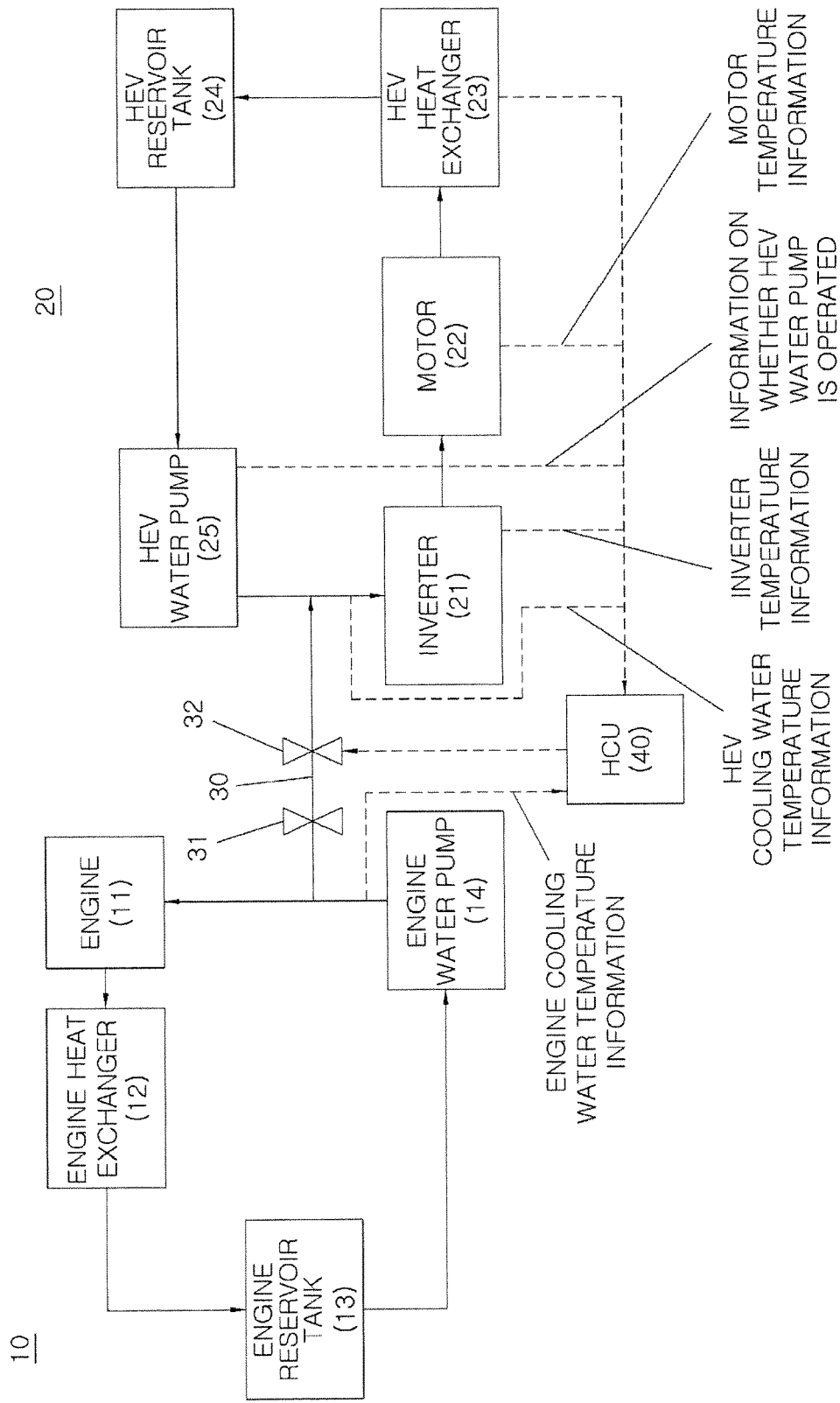
FIG. 1 is a block diagram of a cooling system of an HEV according to an exemplary embodiment of the present inventive concept.

FIG. 1 is a block diagram of a cooling system of an HEV according to an exemplary embodiment of the present inventive concept. Referring to FIG. 1, the cooling system of an HEV according to the exemplary embodiment of the present inventive concept includes an engine cooling circuit 10, an HEV cooling circuit 20, a connection part 30, and a hybrid control unit (HCU) 40.

The engine cooling circuit 10 cools cooling water using an engine heat exchanger 12 and circulates the cooled cooling water using an engine water pump 14 to cool an engine 11.

The HEV cooling circuit 20 cools cooling water using an HEV heat exchanger 23 and circulates the cooled cooling water using an HEV water pump 25 to cool an inverter 21 and a motor 22.

The connection part 30 connects the engine cooling circuit 10 to the HEV cooling circuit 20. The connection part 30 may connect a front end of the engine 11 to a front end of the inverter 21 to introduce the cooling water into the inverter 21 before being introduced into the engine 11 so as to replace a function of the HEV cooling circuit 20, which operates abnormally, and to cool the inverter 21 and the motor 22. However, the connection part 30 is not necessarily limited to the case in which the connection part 30 connects the front end of the engine 11 to the front end of the inverter 21.

The connection part 30 includes a check valve 31 which prevents the cooling water from flowing from the HEV cooling circuit 20 toward the engine cooling circuit 10. The check valve 31 may introduce the cooling water only in a direction from the engine cooling circuit 10 toward the HEV cooling water 20 to prepare for an abnormal operation of the HEV cooling circuit 20. Thus, the operation of the HEV is prevented from stopping due to overheating of the inverter 21 or the motor 22. The overheating is caused when there is lack of cooling water of the HEV cooling circuit 20 due to the cooling water flowing from the HEV cooling circuit 20 toward the engine cooling circuit 10 since the amount of cooling water of the HEV cooling circuit 20 is less than the amount of cooling water of the engine cooling circuit 10.

Further, the connection part 30 may include an electrical opening valve 32 which opens and closes the connection part 30. When the electrical opening valve 32 is open, the cooling water of the engine cooling water 10 is introduced into the HEV cooling circuit 20. When the electrical opening valve 32 is closed, the cooling water of the engine cooling circuit 10 is prevented from being introduced into the HEV cooling circuit 20. When the HEV cooling circuit 20 operates abnormally by the electrical opening valve 32, the cooling water of the engine cooling circuit 10 is provided to prevent the operation of the HEV from stopping due to the overheating of the inverter 21 or the motor 22.

The HCU 40 may receive information from at least any one of a motor temperature sensor, an inverter temperature sensor, an engine cooling water temperature sensor, an HEV cooling water temperature sensor, and an HEV water pump operation sensing sensor to open or close the electrical opening valve 32.

Figure 2:
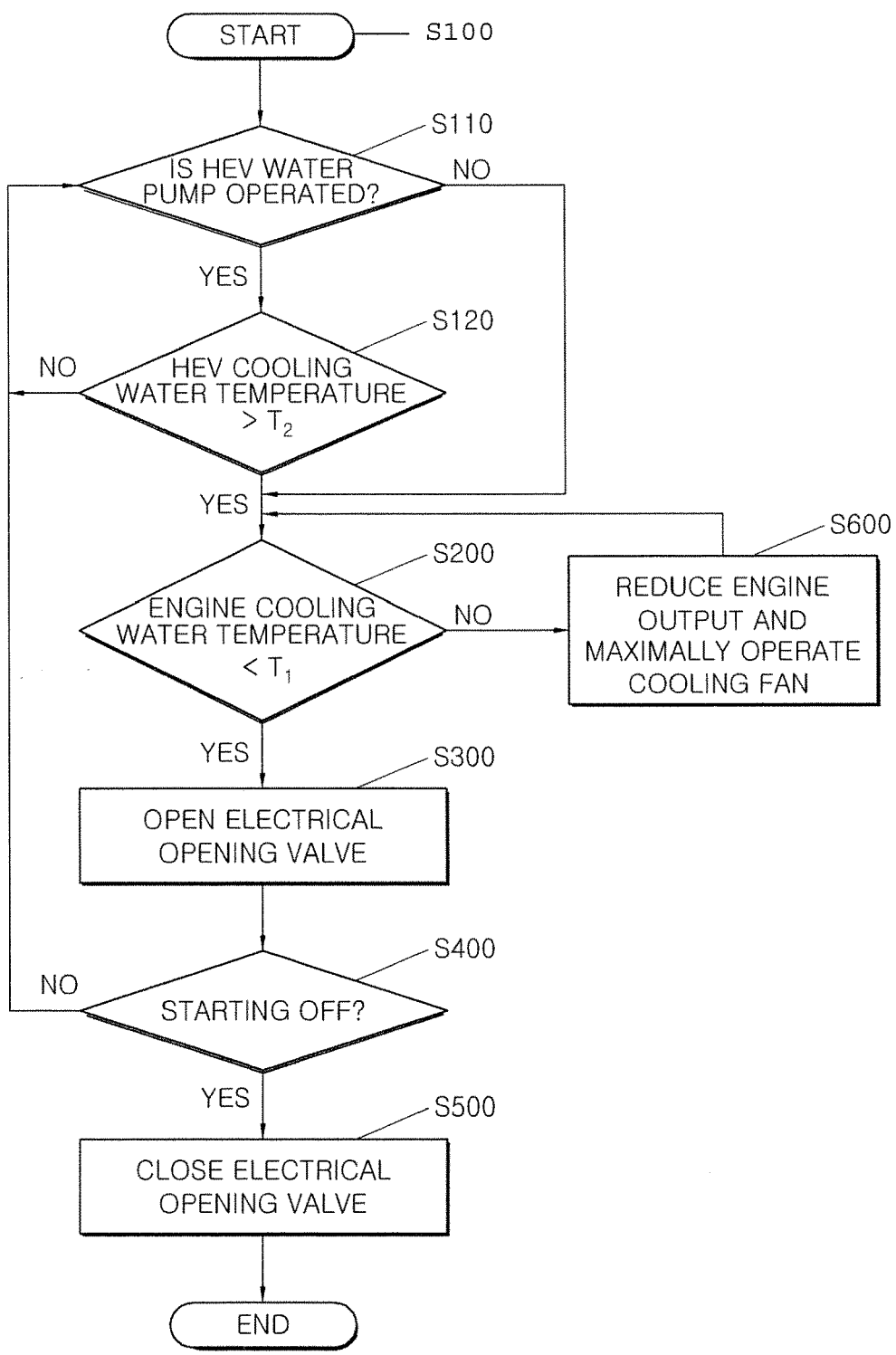
FIG. 2 is a flow chart of a method for controlling a cooling system of an HEV according to an exemplary embodiment of the present inventive concept.

FIG. 2 is a flow chart of a method for controlling a cooling system of HEV according to an exemplary embodiment of the present inventive concept. Referring to FIG. 2, the method for controlling a cooling system of an HEV according to the exemplary embodiment of the present inventive concept includes determining an abnormal operation (S100), determining an engine cooling water temperature (S200), opening a valve (S300), determining starting (S400), closing the valve (S500), and cooling engine cooling water (S600).

The step of determining the abnormal operation (S100) determines whether the HEV cooling circuit 20 operates abnormally and determines whether the HEV water pump operates (S110). If it is determined that the HEV water pump operates, whether or not the HEV cooling water temperature exceeds a second preset temperature $T_2$ is determined (S120).

The abnormal operation (S100) is determined by the HCU 40 which receives information from at least one of the motor temperature sensor, the inverter temperature sensor, the HEV cooling water temperature sensor, and the HEV water pump operation sensing sensor. For example, when the HEY water pump 25 does not operate, it is determined that the HEV cooling circuit operates abnormally. Further, when the temperature of the inverter 21 or the motor 22 exceeds a third preset temperature $T_3$ or a fourth preset temperature $T_4$ or the HEV cooling water temperature is the second preset temperature $T_2$, it is determined that the HEV cooling circuit operates abnormally. The second preset temperature $T_2$, the third preset temperature $T_3$, or the fourth preset temperature $T_4$ may be differently set depending on the HEV cooling circuit 20.

If it is determined that the HEV water pump does not operate in step S110, the HEV cooling circuit 20 operates abnormally and therefore the step of determining the engine cooling water temperature (S200) is performed without performing the step of determining the HEV cooling water temperature (S120).

If it is determined that the HEV water pump operates in step S110, it is determined whether the HEV cooling water temperature exceeds the second preset temperature $T_2$ and thus it is determined whether the HEV cooling circuit 20 operates abnormally. Then, the step of determining the HEV cooling water temperature (S120) is performed. If it is determined that the HEV cooling water temperature exceeds the second preset temperature $T_2$, it is determined that the HEV cooling circuit 20 operates abnormally and then the step of determining the engine cooling water temperature (S200) is performed.

If it is determined that the HEV cooling water temperature is equal to or less than the second preset temperature $T_2$ in step S120, the HEV cooling circuit 20 currently operates normally, and therefore the control method returns to the step of determining whether the HEV water pump operates (S110) and to determine whether the HEV water pump operates.

If it is determined that the HEV cooling circuit operates abnormally in step S100, the step of determining the engine cooling water temperature (S200) determines whether the engine cooling water temperature is less than the first preset temperature $T_1$. A cooling water control temperature (85° C. to 95° C.) of the engine cooling circuit 10 and a cooling water control temperature (35° C. to 50° C.) of the HEV cooling circuit 20 are different, and therefore, the engine cooling water temperature needs to be checked before introducing the cooling water of the engine cooling circuit into the HEV cooling circuit. The first preset temperature $T_1$ may be set to be 50° C. but is not limited thereto, and therefore may be differently set depending on the HEV cooling circuit.

If it is determined that the engine cooling water temperature is less than the first preset temperature $T_1$ in step S200, an electrical opening valve 32 is open in step S300. Therefore, the engine cooling water, which is less than the first preset temperature $T_1$, passes through the connection part 30 and is then introduced into the HEV cooling circuit 20. Instead of the HEV cooling circuit 20 which operates abnormally, the introduced engine cooling water cools the inverter 21 or the motor 22, and as a result, the cooling water of the engine cooling circuit is supplied to the HEV cooling circuit in emergency situations in which the HEV system is overheated to ensure driving stability of the HEV. In this case, the check valve 31 may introduce the cooling water only in a direction from the engine cooling circuit 10 toward the HEV cooling circuit 20 to prevent the operation of the HEV from stopping due to the overheating of the inverter 21 or the motor 22, which is caused when there is lack of the cooling water of the HEV cooling circuit 20.

In the step of determining the starting (S400), it is determined whether the HEV is turned off after the electrical opening valve is open (S300). If it is determined that the HEV is turned off (S400), the electrical opening valve 32 is closed in step S500. When the HEV starts, the emergency situations in which the HEV system is overheated are solved and the electrical opening valve 32 is closed, thereby recovering the cooling system of the HEV vehicle to a normal state. If it is determined that the HEV is not turned off after the valve is open (S300), the step of determining the abnormal operation (S100) is performed again, thereby preparing for the emergency situations in which the HEV system is overheated.

The step of cooling the engine cooling water (S600) reduces an engine output and maximally operates a cooling fan attached to the engine exchanger if it is determined that the engine cooling water temperature is equal to or more than the first preset temperature $T_1$ in step S200. As described above, the cooling water control temperature (85° C. to 95° C.) of the engine cooling circuit 10 and the cooling water control temperature (35° C. to 50° C.) of the HEV cooling circuit are different, and therefore, the engine cooling water temperature needs to be lowered before introducing the cooling water of the engine cooling circuit into the HEV cooling circuit. After the engine cooling water is cooled in step S600 to reduce the engine cooling water temperature, the step of determining the first temperature (S200) is again performed to determine whether the engine cooling water temperature is lower than the first preset temperature $T_1$.

As set forth above, according to the exemplary embodiment of the present inventive concept, it is possible to ensure driving stability of the HEV by providing the cooling water of the engine cooling circuit to the HEV cooling circuit in the emergency situations in which the HEV system is overheated.

Further, it is possible to prevent the operation of the HEV from stopping due to lack of the cooling water of the HEV cooling circuit by allowing the check valve to introduce the cooling water only in one direction from the engine cooling circuit toward the HEV cooling circuit.

The foregoing exemplary embodiments are only examples to allow a person having ordinary skill in the art to which the present inventive concept pertains (hereinafter, referred to as those skilled in the art) to easily practice the present invention. Accordingly, the present disclosure is not limited to the foregoing exemplary embodiments and the accompanying drawings, and therefore, a scope of the present disclosure is not limited to the foregoing exemplary embodiments. Accordingly, it will be apparent to those skilled in the art that substitutions, modifications, and variations can be made without departing from the spirit and scope of the disclosure as defined by the appended claims and can also belong to the scope of the disclosure.

What is claimed is:

1. A method for controlling a cooling system of a hybrid electric vehicle (HEV), which comprises a HEV cooling circuit, an engine cooling circuit, and a check valve that prevents an engine cooling water from flowing from the HEV cooling circuit toward the engine cooling circuit, the method comprising steps of:
    determining whether the HEV cooling circuit, which includes a HEV reservoir tank, operates abnormally;
    if the HEV cooling circuit operates abnormally, determining whether the engine cooling water temperature is less than a first preset temperature;
    if the engine cooling water temperature is less than the first preset temperature, opening an electrical opening valve to introduce an engine cooling water into the HEV cooling circuit;
    determining whether starting of the HEV is an off state after the electrical opening valve is open; and
    if the starting of the HEV is the off state, closing the electrical opening valve,
    wherein the step of opening an electrical opening valve introduces the engine cooling water only in a direction from the engine cooling circuit toward the HEV cooling circuit.

2. The method of claim 1, wherein the step of determining the abnormal operation includes determining whether an HEV water pump is not operating.

3. The method of claim 2, wherein the step of determining the abnormal operation further includes, if the HEV water pump is not operating, determining whether an HEV cooling water temperature exceeds a second preset temperature.

4. The method of claim 1, further comprising:
    if the engine cooling water temperature is equal to or more than the first preset temperature, cooling the engine cooling water in which an engine output is reduced and a cooling fan attached to an engine exchanger maximally operates.

* * * * *